(12) United States Patent
Sugimoto et al.

(10) Patent No.: US 7,906,566 B2
(45) Date of Patent: Mar. 15, 2011

(54) CURABLE LIQUID RESIN COMPOSITION

(75) Inventors: Masanobu Sugimoto, Tokyo (JP); Satoshi Kamo, Tokyo (JP); Takeo Shigemoto, Tokyo (JP); Zen Komiya, Tokyo (JP); Paulus Antonius Maria Steeman, Spaubeek (NL)

(73) Assignee: DSM IP Assets B.V., Te Heerlen (NL)

( * ) Notice: Subject to any disclaimer, the term of this patent is extended or adjusted under 35 U.S.C. 154(b) by 1076 days.

(21) Appl. No.: 10/571,758

(22) PCT Filed: Sep. 17, 2004

(86) PCT No.: PCT/NL2004/000644
§ 371 (c)(1),
(2), (4) Date: Jan. 8, 2007

(87) PCT Pub. No.: WO2005/026228
PCT Pub. Date: Mar. 24, 2005

(65) Prior Publication Data
US 2007/0203258 A1    Aug. 30, 2007

(30) Foreign Application Priority Data
Sep. 17, 2003   (JP) .................. 2003-323908

(51) Int. Cl.
C09D 11/00 (2006.01)
C08G 18/00 (2006.01)
B32B 15/00 (2006.01)
A01G 9/02 (2006.01)

(52) U.S. Cl. ......... 523/160; 523/161; 428/375; 525/452; 525/123; 524/556

(58) Field of Classification Search ............ 523/160, 523/161; 524/556; 525/452, 123; 428/375
See application file for complete search history.

(56) References Cited

U.S. PATENT DOCUMENTS

| 5,093,386 A | * | 3/1992 | Bishop et al. ............ 522/96 |
| 6,323,255 B1 | * | 11/2001 | Snowwhite ............ 522/120 |
| 2003/0210879 A1 | | 11/2003 | Oshio et al. |

FOREIGN PATENT DOCUMENTS

| EP | 1 361 240 A1 | 11/2003 |
| EP | 1361240 A1 * | 11/2003 |
| JP | 63275619 A * | 11/1988 |
| WO | WO 00/18696 | 4/2000 |

OTHER PUBLICATIONS

International Search Report.
Database WPI, Derwent Publications Ltd., London, GB; XP002248773 & JP63275619 (Desoto Inc.) Nov. 14, 1988.

* cited by examiner

*Primary Examiner* — Michael M Bernshteyn
(74) *Attorney, Agent, or Firm* — Nixon & Vanderhye P.C.

(57) ABSTRACT

The invention relates to a curable liquid resin composition comprising: (A) a urethane(meth)acrylate having a structure originating from a polyol and a number average molecular weight of 800 g/mol or more, but less than 6,000 g/mol, and (B) a urethane(meth)acrylate having a structure originating from a polyol and a number average molecular weight of 6,000 g/mol or more, but less than 20,000 g/mol, wherein the total amount of the component (A) and component (B) is 20-95 wt % of the curable liquid resin composition and the content of the component (B) is 0.1-30 wt % of the total of the component (A) and component (B).

17 Claims, No Drawings

CURABLE LIQUID RESIN COMPOSITION

This application is the U.S. national phase of international application PCT/NL2004/000644 filed 17 Sep. 2004 which designated the U.S. and claims benefit of JP 2003-323908, dated 17 Sep. 2003, the entire content of which is hereby incorporated by reference.

FIELD OF THE INVENTION

The present invention relates to a curable liquid resin composition. The invention further relates to a curable liquid resin composition system, the use of said curable liquid resin composition, to a coated optical fiber and to an optical fiber ribbon.

DESCRIPTION OF RELATED ART

In the fabrication of optical fibers, a resin coating is applied for protection and reinforcement immediately after spinning molten glass fibers. As the resin coating, a structure in which a flexible primary coating layer is provided on the surface of a glass fiber and a rigid secondary coating layer is provided on the outside of the primary coating layer is known. Before subjecting the optical fibers provided with a resin coating to practical application, several optical fibers, for example four, eight or twelve optical fibers, are arranged side by side on a plane and secured using a bundling material, thereby forming a ribbon structure with a rectangular cross section. A resin composition for forming the primary coating layer is called a primary resin composition, a resin composition for forming the secondary coating layer is called a secondary resin composition, and a material for binding several optical fibers is called a ribbon matrix material. Further, individual fibers often are provided with a coloring or ink layer, formed from an ink material, to be able to identify individual fibers. In certain cases, the individually coated fibers that have a thickness of about 250 µm are provided with a further coating layer to make a thicker and thereby more easy to handle fiber. Such a coating is denoted as an upjacketing coating or a buffer coating, formed from an upjacketing or buffer material.

In many cases, a secondary material, a buffer material or a ribbon matrix material are used as an outermost layer in the manufacturing process. For example, after coating a secondary material and curing the coating, coated optical fibers wound around a bobbin are stored and, thereafter, are wound off the bobbin for applying an ink layer or for being processed into ribbons. The ribbons produced are wound around a bobbin and stored and, when processed into cables, the ribbons rub together. In this manner, cured secondary materials and ribbon matrix materials come strong force, coated fibers and ribbons cannot be appropriately wound around a bobbin and cannot be smoothly wound off, thereby hindering the manufacturing process.

As a method for reducing the attaching force among the cured materials, an approach concerning the process of curing coatings in a nitrogen atmosphere has been studied. The attaching force is increased if the materials are cured in an atmosphere containing oxygen. For this reason, an effective method for overcoming this problem in regard to material has been desired.

Accordingly, an object of the present invention is to provide a curable liquid resin composition having conventional characteristics as a protective film such as a secondary material and a ribbon matrix material and capable of forming an excellent surface exhibiting a low attaching force and a low coefficient of friction after curing.

It is a further object of the invention to provide a curable liquid resin composition, in particular a secondary resin composition, with improved processability. The preparation of coated optical fibers today involves passing the fibers through a coating die mounted within a device known as a draw tower, followed by curing the applied resin compositions. In wet-on-wet applications secondary resin compositions are applied to an optical glass fiber simultaneously with a primary resin composition, after which both resin compositions are simultaneously cured. Typically, the rheological properties of primary resin compositions and secondary resin compositions are different, i.e. said compositions feature a limited rheological compatibility. This may cause certain problems. The drag flow induced by the moving fiber at high drawing speeds gives rise to high shear rates, typically being between $10^5$ and $10^6$ $s^{-1}$ at the location near the exit of the coating cup. Optical fiber resin compositions usually show complicated non-Newtonian behavior as shear rate increases. Due to this, processability instabilities often occur during fiber production, in particular in wet-on-wet applications where primary resin compositions and secondary resin compositions with different rheological properties are applied. Another significant problem concerns the degree of uniformity in the coating after curing. More specifically, in high quality coated fibers, the thickness of the coating layer possesses a high degree of uniformity along the length of the fiber. At high speeds, however, typically above about 25 m/sec, a combination of high fiber speed, relatively small clearance between the outer surface of the fiber and die, die length, pressure exerted on the composition as it is fed into the die, and properties of the uncured coating compositions, can result in unacceptably low levels of uniformity in a cured coating.

Optical fibers with low levels of coating uniformity can present problems when one desires to splice two optical fibers together. Non-uniformity may also translate into data transmissions problems after installation into a data network, e.g., signal attenuation.

One means of addressing processing instability and coating uniformity problems is to redesign the draw tower and associated die. This remedy, however, is rarely used because draw towers are large, technologically sophisticated devices that cost millions of dollars to design and build. Moreover, even if this remedy is adopted, it provides only temporary relief. The need to recoup the investment in a new draw tower will push the manufacturer to run the fiber through the tower at ever increasing speeds. Faster speeds will eventually lead to further problems in coating uniformity.

An alternative to draw tower and die redesign is to control, in some manner, the rheological properties of the curable liquid secondary resin composition. It is therefore a further object of the present invention to provide a radiation curable secondary coating composition with improved processability during optical fiber production.

SUMMARY OF THE INVENTION

The inventors have surprisingly found that, in a curable liquid resin composition comprising a urethane(meth)acrylate as a major component, if two urethane(meth)acrylates with different molecular weights having a structure originating from a polyol are used in combination in specific amounts, a transparent curable liquid resin composition producing an excellent cured surface with a low attaching force and a low coefficient of friction after curing can be obtained.

Specifically, the present invention provides a curable liquid resin composition comprising (A) a urethane(meth)acrylate having a structure originating from a polyol, and a number average molecular weight of 800 g/mol or more, but less than 6000 g/mol and (B) a urethane(meth)acrylate having a structure originating from a polyol and a number average molecular weight of 6,000 g/mol or more, but less than 20,000 g/mol, wherein the total amount of the component (A) and component (B) is 30-95 wt % of the total amount of the curable liquid resin composition and the content of the component (B) is 0.1-30 wt % of the total amount of the component (A) and component (B).

Furthermore, the inventors have surprisingly found that the processability of combinations of primary and secondary resin compositions in for example wet-on-wet applications can be enhanced when a secondary resin composition with an enhanced liquid elasticity is used. The liquid elasticity can be expressed as the state compliance which is preferably 2.0 $MPa^{-1}$ or more.

The curable liquid resin composition of the present invention suitable for a secondary material and a ribbon matrix material is transparent and feature a high steady state compliance in the liquid state and can form an excellent surface exhibiting a low attaching force and a low coefficient of friction after curing.

DETAILED DESCRIPTION OF THE INVENTION

The urethane(meth)acrylates (A) and (B) used in the present invention are preferably produced by reacting (a) a polyol, (b) a polyisocyanate, and (c) a (meth)acrylate containing a hydroxyl group. Specifically, a urethane(meth)acrylate is produced by reacting isocyanate groups of a polyisocyanate respectively with a hydroxyl group of a polyol and a hydroxyl group of a (meth)acrylate containing a hydroxyl group.

This reaction is carried out, for example, by charging a polyol, polyisocyanate, and (meth)acrylate containing a hydroxyl group and reacting them altogether; reacting a polyol and a polyisocyanate, and reacting the resulting product with a (meth)acrylate containing a hydroxyl group; reacting a polyisocyanate and (meth)acrylate containing a hydroxyl group, and reacting the resulting product with a polyol; and reacting a polyisocyanate and (meth)acrylate containing a hydroxyl group, reacting the resulting product with a polyol, and further reacting the resulting product with a (meth)acrylate containing a hydroxyl group.

The proportion of the polyol, polyisocyanate, and (meth) acrylate containing a hydroxyl group is preferably determined so that isocyanate groups included in the polyisocyanate and hydroxyl groups included in the (meth)acrylate containing a hydroxyl group are respectively 1.1-3 equivalents and 0.2-1.5 equivalents for one equivalent of hydroxyl groups included in the polyol.

In the reaction of these compounds, it is preferable to use a urethanization catalyst such as copper naphthenate, cobalt naphthenate, zinc naphthenate, di-n-butyltin dilaurate, triethylamine, 1,4-diazabicyclo[2.2.2]octane, or 2,6,7-trimethyl-1,4-diazabicyclo[2.2.2]octane in an amount of 0.01-1 part by weight for 100 parts by weight of the total reactant. The reaction is carried out at a temperature of preferably 10-90° C., and particularly preferably 30-80° C.

As examples of the diisocyanate (b), 2,4-toluene diisocyanate, 2,6-toluene diisocyanate, 1,3-xylylene diisocyanate, 1,4-xylylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylphenylene diisocyanate, 4,4'-biphenylene diisocyanate, 1,6-hexane diisocyanate, isophorone diisocyanate, methylenebis(4-cyclohexylisocyanate), 2,2,4-trimethylhexamethylene diisocyanate, bis(2-isocyanate ethyl)fumarate, 6-isopropyl-1,3-phenyl diisocyanate, 4-diphenylpropane diisocyanate, lysine diisocyanate, hydrogenated diphenylmethane diisocyanate, hydrogenated xylylene diisocyanate, tetramethylxylylene diisocyanate, 2,5(or 6)-bis(isocyanatemethyl)-bicyclo[2.2.1] heptane, and the like or any combinations thereof can be given. Of these, 2,4-toluene diisocyanate, isophorone diisocyanate, xylylene diisocyanate, and methylenebis(4-cyclohexylisocyanate) are particularly preferable.

These polyisocyanates may be used either individually or in combinations of two or more.

As examples of the (meth)acrylate containing a hydroxyl group (C), 2-hydroxyethyl(meth)acrylate, 2-hydroxypropyl (meth)acrylate, 2-hydroxybutyl(meth)acrylate, 2-hydroxy-3-phenyloxypropyl(meth)acrylate, 1,4-butanediol mono(meth) acrylate, 2-hydroxyalkyl(meth)acryloyl phosphate, 4-hydroxycyclohexyl(meth)acrylate, 1,6-hexanediol mono (meth)acrylate, neopentyl glycol mono(meth)acrylate, trimethylolpropane di(meth)acrylate, trimethylolethane di(meth) acrylate, pentaerythritol tri(meth)acrylate, dipentaerythritol penta(meth)acrylate, and (meth)acrylates shown by the following formulas (1) and (2) can be given.

(1)

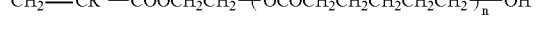

(2)

wherein $R^1$ represents a hydrogen atom or a methyl group and n is an integer from 1 to 15.

Compounds obtained by the addition reaction of (meth) acrylic acid and a compound containing a glycidyl group such as alkyl glycidyl ether, allyl glycidyl ether, or glycidyl(meth) acrylate can also be used as the hydroxyl group-containing (meth)acrylate. Of these (meth)acrylates containing a hydroxyl group, 2-hydroxyethyl (meth)acrylate and 2-hydroxypropyl(meth)acrylate are particularly preferable.

These (meth)acrylates compounds containing a hydroxyl group may be used either individually or in combinations of two or more.

There are no specific limitations to the polyol (a) used as the raw material for the component (A) and component (B). Examples of suitable polyols include those used in the oligomers disclosed in WO00/18696 (p.7, l.1, p.15, l.30). Preferably the polyol is a polyether polyol or a polyester polyol. Preferably the polyol is a diol.

Aliphatic or cyclic polyether polyols can be given as examples. As examples of the aliphatic polyether polyol, polyethylene glycol, polypropylene glycol, polytetramethylene glycol, polyhexamethylene glycol, polyheptamethylene glycol, polydecamethylene glycol, polyether polyols obtained by the ring-opening copolymerization of two or more ion-polymerizable cyclic compounds, and the like can be given. As examples of the ion-polymerizable cyclic compounds, cyclic ethers such as ethylene oxide, propylene oxide, 1,2-butylene oxide, butene-1-oxide, isobutene oxide, 3,3-bischloromethyloxetane, tetrahydrofuran, 2-methyltetrahydrofuran, 3-methyltetrahydrofuran, dioxane, trioxane, tetraoxane, cyclohexene oxide, styrene oxide, epichlorohydrin, glycidyl methacrylate, allyl glycidyl ether, allyl glycidyl carbonate, butadiene monoxide, isoprene monoxide, vinyl oxetane, vinyl tetrahydrofuran, vinyl cyclohexene oxide, phenyl glycidyl ether, butyl glycidyl ether, and glycidyl benzoate can be given. Moreover, polyether polyols obtained by ring-opening copolymerization of the above ion-polymerizable cyclic compounds with monomers, for example, cyclic imines such as ethyleneimine, cyclic lactone acids such as β-propyolactone and glycolic acid lactide, and dimethylcyclopolysiloxanes can be used. As examples of specific combinations of two or more ion-polymerizable cyclic compounds, combinations of tetrahydrofuran and propylene oxide, tetrahydrofuran and 2-methyltetrahydrofuran, tetrahydrofuran and 3-methyltetrahydrofuran, tetrahydrofuran and ethylene oxide, propylene oxide and ethylene oxide, butene-1-oxide and ethylene oxide, a ternary copolymer of tetrahydrofuran, butene-1-oxide, and ethylene oxide, and the like can be given. The ring-opening copolymer of these ion-polymerizable cyclic compounds may be either a random copolymer or a block copolymer.

As examples of cyclic polyether polyols, alkylene oxide addition diol of bisphenol A, alkylene oxide addition diol of bisphenol F, hydrogenated bisphenol A, hydrogenated bisphenol F, alkylene oxide addition diol of hydrogenated bisphenol A, alkylene oxide addition diol of hydrogenated bisphenol F, alkylene oxide addition diol of hydroquinone, alkylene oxide addition diol of naphthohydroquinone, alkylene oxide addition diol of anthrahydroquinone, 1,4-cyclohexanediol and alkylene oxide addition diol thereof, tricyclodecanediol, tricyclodecanedimethanol, pentacyclopentadecanediol, pentacyclopentadecanedimethanol, and the like can be given. Of these, alkylene oxide addition diol of bisphenol A, tricyclodecanedimethanol, and the like are preferable.

Among the above polyether polyols, at least one polyether polyol selected from the group consisting of polypropylene glycol, a copolymer of 1,2-butylene oxide and ethylene oxide, and a copolymer of propylene oxide and ethylene oxide is preferable.

The number average molecular weight of the urethane (meth)acrylate (A) is preferably 800 g/mol or more, but less than 6,000 g/mol, preferably less than 5,000 g/mol, more preferable less than 4,000 g/mol and particularly preferably less than 3,000 g/mol. For this reason, the polyol (a) used as a raw material of the component (A) is selected according to the molecular weight.

In one embodiment of the invention, among the above polyols, at least one polyol selected from the group consisting of polyester polyols or polyether polyols is preferable as the polyol (a) used as the raw material for the component (A), for example polypropylene glycol, a copolymer of 1,2-butylene oxide and ethylene oxide, and a copolymer of propylene oxide and ethylene oxide. Polypropylene glycol such as PPG400, PPG1000, PPG2000, PPG3000, EXCENOL 720, 1020, 2020 (manufactured by Asahi Glass Urethane Co., Ltd.) and copolymer polyols of 1,2-butylene oxide and ethylene oxide such as EO/BO500, EO/BO1000, EO/BO2000, EO/BO3000, EO/BO4000 (manufactured by Daiichi Kogyo Seiyaku Co., Ltd.) are commercially available. These polyols may be used either individually or in combinations of two or more.

In another embodiment of the invention, as the polyol (a) used as the raw material for the urethane(meth)acrylate (B) among the above-mentioned polyols, at least one polyester polyol or polyether polyol is preferred, for example a polyether polyol selected from the group consisting of polypropylene glycol, a copolymer of 1,2-butylene oxide and ethylene oxide, and a copolymer of propylene oxide and ethylene oxide. The component (A) differs from the component (B) in the molecular weight of the polyol (a) used as the raw material, but the component (A) and the component (B) need not have a common chemical structure. For example, the polyol (a) used as the raw material for the component (A) may be a copolymer of 1,2-butylene oxide and ethylene oxide, and the polyol (a) used as the raw material for the component (B) may be polypropylene glycol. In another embodiment of the invention, the polyol (a) used as used as the raw material for the component (B) may be a polyether polyol.

The number average molecular weight of the component (B) is usually 6,000-20,000 g/mol, preferably 8,000-18,000 g/mol, and more preferably 7,000-16,000 g/mol. For this reason, the polyol (a) used as a raw material for the component (B) is selected according to the molecular weight. As examples of commercially available products of the polyol (a), PREMINOL PML S-X4008, PML S-4011, PML S-X3008, PML S-3011, PML S-X3015, PML 4016, PML 7001, PML 7003, and PML 7012 (manufactured by Asahi Glass Co., Ltd.) can be given.

The total amount of the component (A) and component (B) added to the curable liquid resin composition of the present invention is usually 20-95 wt %, preferably 30-95 wt %, more preferably 40-80 wt %, and most preferably 50-80 wt %. If the amount is less than 20 wt % the attaching force between the cured products may be strong; if more than 95 wt %, applicability may be impaired.

The component (B) is added in an amount of 0.1-30 wt %, preferably 0.1-20 wt %, and more preferably 0.5-20 wt % of the total amount of the component (A) and the component (B). If the amount is less than 0.1 wt % the attaching force between the cured products may be strong; if more than 30 wt %, applicability may be impaired.

A urethane(meth)acrylate obtained by reacting 1 mol of diisocyanate (b) with 2 mols of (meth)acrylate containing a hydroxyl group without using the polyol (a) may be added to the curable liquid resin composition of the present invention. Given as examples of such a urethane(meth)acrylate are the reaction product of hydroxyethyl(meth)acrylate and 2,4-toluene diisocyanate, reaction product of hydroxyethyl(meth)acrylate and 2,5 (or 6)-bis(isocyanatemethyl)-bicyclo[2.2.1]heptane, reaction product of hydroxyethyl(meth)acrylate and isophorone diisocyanate, reaction product of hydroxypropyl(meth)acrylate and 2,4-toluene diisocyanate, and reaction product of hydroxypropyl(meth)acrylate and isophorone diisocyanate.

A polymerizable monomer may be further incorporated in the curable liquid resin composition of the present invention as a component (C). A polymerizable monomer is herein understood to be a polymerizable monofunctional monomer (C1) or a polymerizable polyfunctional monomer (C2). The addition of the component (C) can adjust the viscosity of the liquid composition, allowing the composition to be handled with ease, and can adjust the Young's modulus of elasticity of the cured products. Furthermore, the addition of the component (C2) can increase the mutual solubility with the component (B) and improve transparency of the liquid composition and its cured products.

As examples of the polymerizable monofunctional monomer (C1), N-vinylpyrrolidone, lactams containing a vinyl group such as N-vinylcaprolactam, (meth)acrylates containing an alicyclic structure such as isobornyl(meth)acrylate, bornyl(meth)acrylate, tricyclodecanyl(meth)acrylate, and dicyclopentanyl(meth)acrylate, benzyl(meth)acrylate, 4-butylcyclohexyl(meth)acrylate, acryloylmorpholine, vinyl imidazole, vinyl pyridine, 2-hydroxyethyl(meth)acrylate, 2-hydroxypropyl(meth)acrylate, 2-hydroxybutyl(meth)acrylate, methyl(meth)acrylate, ethyl(meth)acrylate, propyl(meth)

acrylate, isopropyl(meth)acrylate, butyl(meth)acrylate, amyl (meth)acrylate, isobutyl(meth)acrylate, t-butyl(meth)acrylate, pentyl(meth)acrylate, isoamyl(meth)acrylate, hexyl (meth)acrylate, heptyl(meth)acrylate, octyl(meth)acrylate, isooctyl(meth)acrylate, 2-ethylhexyl(meth)acrylate, nonyl (meth)acrylate, decyl(meth)acrylate, isodecyl(meth)acrylate, undecyl(meth)acrylate, dodecyl(meth)acrylate, lauryl (meth)acrylate, stearyl(meth)acrylate, isostearyl(meth) acrylate, tetrahydrofurfuryl(meth)acrylate, butoxyethyl (meth)acrylate, ethoxydiethylene glycol(meth)acrylate, nonylphenol ethylene oxide-modified (meth)acrylate, benzyl (meth)acrylate, phenoxyethyl(meth)acrylate, polyethylene glycol mono(meth)acrylate, polypropylene glycol mono (meth)acrylate, methoxyethylene glycol(meth)acrylate, ethoxyethyl(meth)acrylate, methoxypolyethylene glycol (meth)acrylate, methoxypolypropylene glycol(meth)acrylate, diacetone(meth)acrylamide, isobutoxymethyl(meth) acrylamide, N,N-dimethyl(meth)acrylamide, t-octyl(meth) acrylamide, dimethylaminoethyl(meth)acrylate, diethylaminoethyl(meth)acrylate, 7-amino-3,7-dimethyloctyl(meth)acrylate, N,N-diethyl(meth)acrylamide, N,N-dimethylaminopropyl(meth)acrylamide, hydroxybutyl vinyl ether, lauryl vinyl ether, cetyl vinyl ether, 2-ethylhexyl vinyl ether, and compounds shown by the following formulas (3) to (6) can be given;

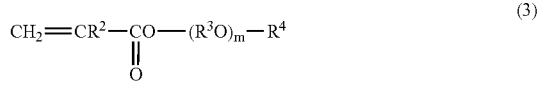

(3)

wherein $R^2$ represents a hydrogen atom or a methyl group, $R^3$ represents an alkylene group having 2-6, and preferably 2-4 carbon atoms, $R^4$ represents a hydrogen atom or an alkyl group having 1-12, and preferably 1-9 carbon atoms, and m is an integer from 0 to 12, and preferably from 1 to 8;

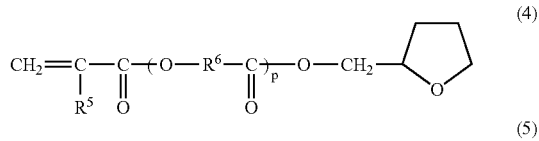

(4)

(5)

wherein $R^5$ represents a hydrogen atom or a methyl group, $R^6$ represents an alkylene group having 2-8, and preferably 2-5 carbon atoms, $R^7$ individually represents a hydrogen atom or a methyl group, and p is an integer preferably from 1 to 4.

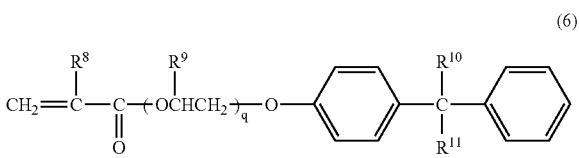

(6)

$R^8$, $R^9$, $R^{10}$, and $R^{11}$ individually represent a hydrogen atom or a methyl group, and q is an integer from 1 to 5.

Of these monofunctional monomers, N-vinylpyrrolidone, lactams containing a vinyl group such as N-vinylcaprolactam, isobornyl(meth)acrylate, and lauryl acrylate are preferable.

These monofunctional monomers (C1) are commercially available as IBXA (manufactured by Osaka Organic Chemical Industry Co., Ltd.), Aronix M-111, M-113, M-114, M-117, TO-1210 (manufactured by Toagosei Co., Ltd.), and the like.

As examples of the polymerizable polyfunctional monomer (C2), trimethylolpropane tri(meth)acrylate, trimethylolpropanetrioxyethyl(meth)acrylate, pentaerythritol tri(meth) acrylate, ethylene glycol di(meth)acrylate, triethylene glycol diacrylate, tetraethylene glycol di(meth)acrylate, tricyclodecanediyldimethanol di(meth)acrylate, polyethylene glycol di(meth)acrylate, 1,4-butanediol di(meth)acrylate, 1,6-hexanediol di(meth)acrylate, neopentyl glycol di(meth)acrylate, tripropylene glycol di(meth)acrylate, neopentyl glycol di(meth)acrylate, both terminal (meth)acrylic acid addition compound of bisphenol A diglycidyl ether, pentaerythritol tri(meth)acrylate, pentaerythritol tetra(meth)acrylate, polyester di(meth)acrylate, tris(2-hydroxyethyl)isocyanurate tri (meth)acrylate, tris(2-hydroxyethyl)isocyanurate di(meth) acrylate, tricyclodecanedimethanol di(meth)acrylate, di(meth)acrylate of ethylene oxide or propylene oxide addition diol of bisphenol A, di(meth)acrylate of ethylene oxide or propylene oxide addition diol of hydrogenated bisphenol A, epoxy(meth)acrylate in which (meth)acrylate is added to diglycidyl ether of bisphenol A, and triethylene glycol divinyl ether can be given.

Of these polymerizable polyfunctional monomers (C2), tricyclodecanediyldimethanol di(meth)acrylate, di(meth) acrylate of ethylene oxide addition of bisphenol A, and tris (2-hydroxyethyl)isocyanurate tri(meth)acrylate are preferable.

As commercially available products of these polymerizable polyfunctional compounds (C2), Yupimer UV, SA-1002 (manufactured by Mitsubishi Chemical Corp.), Aronix M-215, M-315, M-325, TO-1210 (manufactured by Toagosei Co., Ltd.), and the like can be given.

These components (C) are added to the curable liquid resin composition of the present invention in an amount of preferably 10-55 wt %, and particularly preferably 20-55 wt %. If the amount is less than 10 wt % or exceeds 90 wt %, application may become uneven due to changes in the application form.

The curable liquid resin composition of the present invention may comprise a polymerization initiator as component (D). As the polymerization initiator, a heat polymerization initiator or a photoinitiator can be used.

In the case of curing the curable liquid resin composition of the present invention using heat, a heat polymerization initiator such as a peroxide or azo compound is used. As specific examples of the heat polymerization initiator, benzoyl peroxide, t-butyloxybenzoate, and azobisisobutyronitrile can be given.

In the case of curing the curable liquid resin composition of the present invention using light, a photoinitiator is used. In addition, a photosensitizer is preferably added as required. As examples of photoinitiators, 1-hydroxycyclohexyl phenyl ketone, 2,2-dimethoxy-2-phenylacetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2,4,6-trimethylbenzoyl diphenylphosphine oxide, bis-(2,6-dimethoxybenzoyl)-2,4,4-trimethylpentylphosphine oxide; IRUGACURE 184, 369, 651, 500, 907, CGI 1700, CGI 1750, CGI 1850, CG24-61 (manufactured by Ciba Specialty Chemicals Co.); Lucirin LR8728 (manufactured by BASF); Darocure 1116, 1173 (manufactured by Merck), Ubecryl P36 (manufactured by UCB), and the like can be given. As examples of photosensitizers, triethylamine, diethylamine, N-methyldiethanoleamine, ethanolamine, 4-dimethylaminobenzoic acid, methyl 4-dimethylaminobenzoate, ethyl 4-dimethylaminobenzoate, isoamyl 4-dimethylaminobenzoate; Ubecryl P102, 103, 104, 105 (manufactured by UCB); and the like can be given.

If both heat and ultraviolet light are used to cure the curable liquid resin composition of the present invention, a heat polymerization initiator and photopolymerization initiator can be used in combination. The polymerization initiator (D) is used in the curable liquid resin composition of the present invention in an amount of 0.1-10 wt %, preferably 0.1-5 wt %, and particularly preferably 0.5-5 wt %.

Various additives such as antioxidants, coloring agents, UV absorbers, light stabilizers, silane coupling agents, heat polymerization inhibitors, leveling agents, surfactants, preservatives, plasticizers, lubricants, solvents, fillers, aging preventives, wettability improvers, and coating surface improvers may be optionally added to the curable liquid resin composition of the present invention, insofar as the characteristics of the composition are not adversely affected.

The curable liquid resin composition of the present invention is cured using heat and/or radiation. Radiation used herein refers to infrared rays, visible rays, ultraviolet rays, X-rays, electron beams, $\alpha$-rays, $\beta$-rays, $\gamma$-rays, and the like.

Preferably the liquid resin compositions according to the invention are transparent when observed with the naked eye. The Young's modulus of cured materials obtained after curing the liquid resin composition according to the invention is preferably 30 MPa or more, more preferably 100 MPa or more, even more preferably 300 MPa or more, most preferably 400 MPa or more. The attaching force is preferably 5 N/m or less, more preferably 4 N/m or less. The coefficient of friction is preferably 0.80 or less, more preferably 0.70 or less.

The invention also relates to a curable liquid resin composition with a steady state compliance ($J_e$) of 2 $MPa^{-1}$ or more, preferably 3 $MPa^{-1}$ or more, more preferably 4 $MPa^{-1}$ or more. The Young's modulus of cured materials obtained after curing said liquid resin compositions is preferably 30 MPa or more, more preferably 100 MPa or more, even more preferably 300 MPa or more, in particular 400 MPa or more. Preferably said curable liquid resin composition comprises:
(A) a urethane(meth)acrylate having a structure originating from a polyol and a number average molecular weight of 800 g/mol or more, but less than 6,000 g/mol, and
(B) a urethane(meth)acrylate having a structure originating from a polyol and a number average molecular weight of 6,000 g/mol or more, but less than 20,000 g/mol,
wherein the total amount of the component (A) and component (B) is 30-95 wt % of the curable liquid resin composition and the content of the component (B) is 0.1-30 wt % of the total of the component (A) and component (B).

The use of two urethane(meth)acrylates with different molecular weights having a structure originating from a polyol is particular advantageous as it offers the possibility to obtain a resin composition with a higher liquid elasticity without affecting the crosslink density of the coating after cure. The use of a urethane(meth)acrylate with a higher molecular weight would also increase the liquid elasticity, but is less preferred as it would at the same time reduce the crosslink density of the cured resin.

The present invention is described below in more detail by examples. However, the present invention is not limited to these examples. In the examples, "part(s)" refers to "part(s) by weight".

EXAMPLES

Preparation Example 1

Preparation of urethane(meth)acrylate (A)

A reaction vessel equipped with a stirrer was charged with 18.94 g of isophorone diisocyanate, 0.013 g of 2,6-di-t-butyl-p-cresol, 0.042 g of dibutyltin dilaurate, and 0.004 g of phenothiazine. The mixture was cooled with ice to 10° C. or below while stirring. After the addition of 17.66 g of a ring-opening polymer of propylene oxide with a number average molecular weight of 1,000, the mixture was reacted with stirring for two hours while controlling the liquid temperature at 35° C. or lower. Then, 15.71 g of hydroxyethyl acrylate was added dropwise and the mixture was stirred for 3 hours at 70-75° C. The reaction was terminated when the residual isocyanate content was 0.1 wt % or less. This liquid resin is designated as AU-1.

Preparation Example 2

Preparation of urethane(meth)acrylate (A)

A reaction vessel equipped with a stirrer was charged with 28.590 g of 2,4-toluene diisocyanate, 0.021 g of 2,6-di-t-butyl-p-cresol, 0.072 g of dibutyltin dilaurate, and 0.007 g of phenothiazine. The mixture was cooled with ice to 10° C. or below while stirring. After the addition of 26.450 g of a ring-opening polymer of propylene oxide with a number average molecular weight of 2,000, the mixture was reacted with stirring for two hours while controlling the liquid temperature at 35° C. or lower. Then, 9.700 g of 2-hydroxypropyl acrylate was added dropwise. After further adding 24.740 g of hydroxyethyl acrylate dropwise, the mixture was stirred for 3 hours at 70-75° C. The reaction was terminated when the residual isocyanate content was 0.1 wt % or less. This liquid resin is designated as AU-2.

Preparation Example 3

Preparation of urethane(meth)acrylate (A)

A reaction vessel equipped with a stirrer was charged with 28.6 g of 2,4-toluene diisocyanate, 0.02 g of 2,6-di-t-butyl-p-cresol, 0.07 g of dibutyltin dilaurate, and 0.007 g of phenothiazine. The mixture was cooled with ice to 10° C. or below while stirring. After the addition of 53.4 g of a ring-opening polymer of tetrahydrofuran with a number average molecular weight of 650 (PTHF-650), the mixture was reacted with stirring for two hours while controlling the liquid temperature at 35° C. or lower. Then, 19.1 g of 2-hydroxypropyl acrylate was added dropwise. The mixture was stirred for 3 hours at 70-75° C. The reaction was terminated when the residual isocyanate content was 0.1 wt % or less. This liquid resin is designated as AU-3.

Preparation Example 4

Preparation of urethane(meth)acrylate (B)

A reaction vessel equipped with a stirrer was charged with 3.499 g of isophorone diisocyanate, 0.024 g of 2,6-di-t-butyl-p-cresol, 0.080 g of dibutyltin dilaurate, and 0.008 g of phenothiazine. The mixture was cooled with ice to 10° C. or below while stirring. After the addition of 1.830 g of hydroxyethyl acrylate dropwise while controlling the temperature at 20° C. or less, the mixture was allowed to react for one hour while stirring. Next, 94.559 g of a ring-opening polymer of propylene oxide with a number average molecular weight of 12,000 was added and the mixture was stirred for three hours at 70-75° C. The reaction was terminated when the residual amount of isocyanate was reduced to 0.1 wt % or less. This liquid resin is called BU-1.

Preparation Example 5

Preparation of urethane(meth)acrylate (B)

A reaction vessel equipped with a stirrer was charged with 2.766 g of 2,4-toluene diisocyanate, 0.024 g of 2,6-di-t-butyl-p-cresol, 0.080 g of dibutyltin dilaurate, and 0.008 g of phenothiazine. The mixture was cooled with ice to 10° C. or below while stirring. After the addition of 1.844 g of hydroxyethyl acrylate dropwise while controlling the temperature at 20° C. or less, the mixture was allowed to react for one hour while stirring. Next, 95.279 g of a ring-opening polymer of propylene oxide with a number average molecular weight of 12,000 was added and the mixture was stirred for three hours at 70-75° C. The reaction was terminated when the residual amount of isocyanate was reduced to 0.1 wt % or less. This liquid resin is called BU-2.

Preparation Example 6

Preparation of urethane(meth)acrylate (B)

A reaction vessel equipped with a stirrer was charged with 5.112 g of isophorone diisocyanate, 0.024 g of 2,6-di-t-butyl-p-cresol, 0.080 g of dibutyltin dilaurate, and 0.008 g of phenothiazine. The mixture was cooled with ice to 10° C. or below while stirring. After the addition of 2.674 g of hydroxyethyl acrylate dropwise while controlling the temperature at 20° C. or less, the mixture was allowed to react for one hour while stirring. Next, 92.103 g of a ring-opening polymer of propylene oxide with a number average molecular weight of 8,000 was added and the mixture was stirred for three hours at 70-75° C. The reaction was terminated when the residual amount of isocyanate was reduced to 0.1 wt % or less. This liquid resin is called BU-3.

Preparation Example 7

Preparation of urethane(meth)acrylate (B)

A reaction vessel equipped with a stirrer was charged with 4.055 g of 2,4-toluene diisocyanate, 0.024 g of 2,6-di-t-butyl-p-cresol, 0.080 g of dibutyltin dilaurate, and 0.008 g of phenothiazine. The mixture was cooled with ice to 10° C. or below while stirring. After the addition of 2.704 g of hydroxyethyl acrylate dropwise while controlling the temperature at 20° C. or less, the mixture was allowed to react for one hour while stirring. Next, 93.130 g of a ring-opening polymer of propylene oxide with a number average molecular weight of 8,000 was added and the mixture was stirred for three hours at 70-75° C. The reaction was terminated when the residual amount of isocyanate was reduced to 0.1 wt % or less. This liquid resin is called BU-4.

Preparation Example 8

Preparation of urethane(meth)acrylate (B)

A reaction vessel equipped with a stirrer was charged with 6.07 g of 2,4-toluene diisocyanate, 0.05 g of dibutyltin dilaurate, and 0.007 g of Irganox 3790 (stabilizer). The mixture was cooled with ice to 10° C. or below while stirring. After the addition of 2.70 g of hydroxyethyl acrylate dropwise while controlling the temperature at 20° C. or less, the mixture was allowed to react for one hour while stirring. Next, 90.10 g of Acclaim 4200, a polypropyleneglycol polyol with a number average molecular weight of 4,200 g/mol (commercially available from Lyondell), was added and the mixture was reacted with stirring for two hours while controlling the liquid temperature at 35° C. or lower. The reaction was terminated when the residual isocyanate content was 0.1 wt % or less. This liquid resin is called BU-5.

Examples 1-5 and Comparative Experiments 1-3

Components listed in Table 1 were mixed and stirred to homogenize to obtain liquid curable resin compositions. The compositions and properties of liquid curable resin compositions of Examples and Comparative Examples are shown in Table 1.

Examples 6-7 and Comparative Experiment 4

Components listed in Table 2 were mixed and stirred to homogenize to obtain liquid curable resin compositions. The Young's modulus, the coefficient of friction (COF) and the steady state compliance (Je) of the resins obtained after cure are shown in Table 2.

Examples 8-10 and Comparative Experiment 5

Components listed in Table 3 were mixed and stirred to homogenize to obtain liquid curable resin compositions. The Young's modulus and the steady state compliance (Je) of the resins obtained after cure are shown in Table 3.

Test Methods

Tests Methods Used for the Results in TABLE 1

1) Preparation of test film: The curable liquid resin composition was applied onto a glass plate by using an applicator bar for a thickness of 250 µm. The curable liquid resin composition was cured by irradiation of ultraviolet rays at a dose of 1 J/cm$^2$ in air to obtain a test film.

(2) Properties of liquid resin compositions: The liquid resin compositions were observed by the naked eye to judge their turbidity.

(3) Young's modulus of elasticity: The curable liquid resin composition was applied onto a glass plate by using an applicator bar for a thickness of 250 µm. The curable liquid resin composition was cured by irradiation of ultraviolet rays at a dose of 1 J/cm$^2$ in air to obtain a test film for measuring the Young's modulus of elasticity. The film was cut into a sample in the shape of a strip with a width of 6 mm and a length of 25 mm. The sample was subjected to a tensile test at a temperature of 23° C. and a humidity of 50%. The Young's modulus was calculated from the tensile stress at a strain of 2.5% and a tensile rate of 1 mm/min.

(4) Evaluation of Surface Properties (Film Attaching Force)

The curable liquid resin compositions were applied onto glass plates using an applicator bar for the preparation of films with a 100 µm thickness. The coatings were cured by irradiation of ultraviolet light at a dose of 0.1 J/cm$^2$ in 5% oxygen to produce cured films. The cured films were cutr into rectangles with 1 cm width. The rectangles were adhered with the cured surfaces face-to-face (keeping 1 cm width) and allowed to stand at 23° C. and 50% RH for 24 hours. The attaching strength was measured by a 180° peel test at a drawing speed of 50 mm/min. The attaching strength [N/m] is determined from the force necessary to peel-off the adhered film of 1 cm width.

Tests Methods Used for the Results in Table 2 and 3

(1) Properties of liquid resin compositions: The liquid resin compositions were observed by the naked eye to judge their turbidity.

(2) Coefficient of friction: Single buffered fiber to ribbon test. A single buffered fiber was made using the compositions listed in Table 2 as the buffer materials. A ribbon containing twelve fibers, which was made in a ribbon coating apparatus, was fastened around a steel mandrel with a diameter of 20 cm and a groove width for a twelve-fiber ribbon of 3.2 mm. The matrix material used in the ribbon has the formulation as listed in Table 2 for Comparative Experiment 4, with the exception of the silicone surfactants DC190 and DC57. The mandrel was attached to the crosshead of an Instron 4201 universal testing instrument. The single buffered fiber is attached to a clamp at the base of the Instron and then draped over the mandrel containing the ribbon. A 200 g weight is attached to the end of the single buffered fiber. Care must be taken to ensure that the single buffered fiber is properly aligned along the ribbon and is not allowed to touch either side of the mandrel. The single buffered fiber is pulled across the ribbon at 25 mm/min. The maximum load is reported and allows the coefficient of friction to be calculated. The following equation is used to determine the coefficient of friction:

$$\mu = 1/\pi \ln [F_{tot}/(M \times g) - 1]$$

The coefficient of friction is represented by µ, F represents the maximum peak force, M represents the weight attached to the single buffered fiber, and the acceleration due to gravity is represented by g. Each matrix material is analyzed at least three times in order to ensure that the value is accurate and to provide an estimate of test variance. Each time a material is evaluated a new single buffered fiber is wrapped over a new ribbon on the mandrel.

(3) Determination of the Steady State Compliance

Steady State Compliance $J_e$ $J_e$ is a measure of the elasticity of the radiation-curable coating composition and as such controls the shear thinning behavior of a material. A higher steady state compliance results in more shear thinning, starting at lower shear rates. $J_e$ is determined according to the method described in the experimental section. Together with the zero-shear viscosity ($\eta_0$), $J_e$ largely determines the rheological behavior of the coating composition. For a detailed description of these rheological parameters and their interplay we make reference to pages 109-133 of the book 'Rheology: principles, measurements and applications' by C. W. Macosko, VCH Publishers, 1994 which is incorporated herein by reference.

Although both rheological parameters ($J_e$ and $\eta_0$) are determined at low shear rate, they determine the flow curve as a whole over a broad range of shear rates. Consequently, they also influence the flow of the coating composition in the coating cup to a large extent. It has surprisingly been found now that when $J_e$ is chosen as high as 2 MPa$^{-1}$ or more a secondary coating composition is obtained with improved (more stable) processability during the optical fiber production process, especially when applied in a wet-on-wet coating process in which the inner (primary) and the outer (secondary) coating are applied simultaneously, without intermediate cure.

Instrument and Measurements

The steady state compliance ($J_e$) was determined from dynamic mechanical measurements. These dynamic mechanical experiments were performed with a Rheometric Scientific (now TA instruments) ARES-LS rheometer equipped with a dual range 200-2000 g*cm force rebalance torque transducer, a 25 mm Invar parallel plate geometry, a nitrogen gas oven and a liquid nitrogen cooling facility.

At the start of the experiments, the resin sample was loaded between the parallel plate geometry of the rheometer at room temperature. The plate-plate distance was set to 1.6 mm. After closing of the gas oven, the sample was purged with nitrogen gas for about 5 minutes.

The experiment was run by performing isothermal frequency sweeps with angular frequencies between 100 and 0.1 rad/s (3 frequencies per decade, measured in decreasing order) at 5° C. temperature intervals, starting with 20° C. and lowering the temperature in 5° C. steps until the sample becomes to stiff for the instrument to measure (for the cited examples this limit is typically passed between about −20° C. and about −30° C.). Care had to be taken that the applied strains are well within the linear viscoelastic range. A typical value for the strain amplitude at room temperature is about 20-40%, decreasing to values as low as 0.01-0.02% at the lowest temperatures. The dynamic modulus $(G^* = (G'^2 + G''^2)^{0.5})$ and the phase angle (δ) were collected as a function of the angular frequency. Data points for which the tangent of the phase angle (tan δ) is negative (due to noise) are removed from the set.

Construction of a Master—Curve Via Time-Temperature Superposition

The results of the frequency sweeps (the dynamic modulus G* and the phase angle δ as functions of the angular frequency ω), collected at various temperatures T, were combined into a so-called master curve via time-temperature superposition, following the work by Ferry (J. D. Ferry, 'Viscoelastic properties of polymers' (1980), John Wiley & Sons Inc.). As reference temperature ($T_{ref}$) 20° C. was chosen. For this purpose the commercial rheology data analysis software package IRIS™, developed by Winter et al. was used.

Dynamic properties measured at lower temperatures (T) were shifted to higher frequencies to connect to the data collected at the reference temperature ($T_{ref}$). The horizontal shift factor $a_T$ was determined by shifting the curves of the phase angle and of the dynamic modulus along the logarithmic angular frequency axis, following equations 1 and 2:

$$\delta(\omega, T) = \delta(a_T \omega, T_{ref}) \quad (1)$$

$$G^*(\omega, T) = G^*(a_T \omega, T_{ref}) \quad (2)$$

Care was taken that a good superposition of the curves of both the phase angle (δ) and the dynamic modulus (G*) was simultaneously obtained. Generally this is possible for the materials according to this invention. An often used, but optional, vertical shift factor $b_T$ along the viscosity axis was not allowed in this work.

Extraction of the Steady State Compliance.

For the extraction of the steady state compliance the dynamic master curve was re-plotted in a different format. The storage compliance J' ($=G'/G^{*2}$) and the loss compliance J" ($=G''/G^{*2}$) were plotted as a function of the angular frequency. Both the rheology data analysis package IRIS™ (commercially available from IRIS Development, 14 μm Street, Amherst, Mass. 01002-2007, USA) and the Rheometric Scienctific rheometer control software Orchestratorm can be used for this conversion of the data. The mathematical details can be obtained from Ferry (J. D. Ferry, 'Viscoelastic properties of polymers' (1980) John Wiley & Sons Inc.).

The curve of the storage compliance typically shows a plateau at low angular frequencies, but may be prone to noise. Therefore, care has to be taken that data at too low frequencies are not included in the analysis. Data points at frequencies lower than the frequency ar which the tangent of the phase angle (tan δ) exceeds 100 are removed from the mastercurve since the rheometer is not capable to measure accurate values of the storage compliance is the loss compliance is two decades or more larger than the storage compliance. The plateau value of the storage compliance J' is typically found at angular frequencies of 500-2000 rad/s.

In order to remove noise from the data we extract the value the steady state compliance via the following procedure. The software package IRIS™ version 7 is used to calculate the relaxation time spectrum from the master curve, using a minimum number of modes following the parsimonious model of Winter et al., which has been implemented in the IRIS software (Winter H. H., Baumgärtel M., Soskey P. 1993 'A parsimonious model for viscoelastic Liquids and solids', in A. A. Collyer Ed. 'Techniques in Rheological Measurement', Chapman & Hall, London). For the examples in this application typically less than one relaxation time per decade in frequency of the mastercurve is used. As output of this spectrum calculation, the values for the zero shear viscosity and the steady state compliance are obtained. The accuracy for the steady state compliance determined following this method is typically ±10%.

TABLE 2

| Components | Example 6 | Example 7 | Comparative experiment 4 |
|---|---|---|---|
| UA-3 | 40.09 | 38.86 | 40.91 |
| BU-4 | 2 | 5 | |
| CN120Z (Epoxy Acrylate) | 25.76 | 24.96 | 26.29 |
| 1,6 Hexanediol Diacrylate (HDDA) | 8.01 | 7.77 | 8.18 |
| Isobornyl Acrylate (IBOA) | 10.16 | 9.85 | 10.37 |
| 2-Phenoxyethyl Acrylate (PEA) | 9.99 | 9.68 | 10.2 |
| Diphenyl(2,4,6-trimethylbenzoyl)phosphine oxide) | 1.99 | 1.93 | 2.03 |
| Bis(1,2,2,6,6-pentamethyl-4-piperidinyl)sebacate) | 0.49 | 0.47 | 0.5 |
| Ethylenebis(oxyethylene)bis[3-(5-tert-butyl-4-hydroxy-m-tolyl)propionate]) | 0.49 | 0.47 | 0.5 |
| DC190 (silicone surfactant) | 0.66 | 0.66 | 0.66 |
| DC57 (silicone surfactant) | 0.36 | 0.36 | 0.36 |
| Total | 100 | 100 | 100 |
| (B)/(A) + (B) (wt %) | 4.75 | 11.40 | 0 |
| Young's modulus (MPa) | 820 | 800 | 870 |
| Coefficient of friction (single buffered fiber to ribbon test) | 0.67 | 0.67 | 0.90 |
| Steady state compliance ($J_e$) (MPa$^{-1}$) | 3.0 | 4.0 | 1.1 |

TABLE 3

| Components | Example 8 | Example 9 | Example 10 | Comparative experiment 4 |
|---|---|---|---|---|
| UA-3 | 38.0 | 36.9 | 35.1 | 38.8 |
| BU-5 | 2.0 | 4.8 | 9.5 | |
| Ethoxylated (2EO/Ph) Bisphenol A diacrylate (eBPADA) | 28.5 | 27.7 | 26.3 | 29.1 |
| Propoxylated neopentyl glycol diacrylate (pNPGDA) | 9.5 | 9.2 | 8.8 | 9.7 |
| Isobornyl Acrylate (IBOA) | 19.0 | 18.5 | 17.6 | 19.4 |

TABLE 1

Transparency, Young's modulus, and stickiness.

| | | Example 1 | Example 2 | Example 3 | Example 4 | Example 5 | Comparative Example 1 | Comparative Example 2 | Comparative Example 3 |
|---|---|---|---|---|---|---|---|---|---|
| (A) | UA-1 | 52.37 | 52.37 | | | 52.37 | 52.37 | | 52.37 |
| | UA-2 | | | 76.31 | 76.31 | | | 76.31 | |
| (B) | BU-1 | 2.00 | | | | | | | |
| | BU-2 | | 2.00 | | | 10 | | | 25 |
| | BU-3 | | | 0.50 | | | | | |
| | BU-4 | | | | 1.00 | | | | |
| (C) | M113 | 12.89 | 12.89 | | | 12.89 | 12.89 | | 12.89 |
| | N-Vinylcaprolactam | 4.93 | 4.93 | 9.65 | 9.65 | 4.93 | 4.93 | 9.65 | 4.93 |
| | Lauryl acrylate | | | 10.88 | 10.88 | | | 10.88 | |
| (C2) | Viscoat #700 | 26.65 | 26.65 | | | 26.65 | 26.65 | | 26.65 |
| (D) | Irgacure 184 | 1.97 | 1.97 | 1.97 | 1.97 | 1.97 | 1.97 | 1.97 | 1.97 |
| | TPO-X | 0.89 | 0.89 | 0.89 | 0.89 | 0.89 | 0.89 | 0.89 | 0.89 |
| Other | Sumilizer GA-80 | 0.30 | 0.30 | 0.30 | 0.30 | 0.30 | 0.30 | 0.30 | 0.30 |
| (B)/(A) + (B) (wt %) | | 3.7 | 3.7 | 0.7 | 1.3 | 16.0 | 0 | 0 | 32.3 |
| Evaluation | | | | | | | | | |
| Properties of liquid resin compositions | | Transparent | Transparent | Transparent | Transparent | Transparent | Transparent | Transparent | Turbid |
| Young's modulus (MPa) | | 520 | 530 | 740 | 730 | 410 | 530 | 750 | 450 |
| Stickiness (N/m) | | 3 | 3 | 4 | 3 | 2 | 15 | 6 | 2 |

TABLE 3-continued

| Components | Example 8 | Example 9 | Example 10 | Comparative experiment 4 |
|---|---|---|---|---|
| Lucerine TPO | 1.0 | 1.0 | 0.9 | 1.0 |
| Irgacure 184 | 1.9 | 1.8 | 1.7 | 1.9 |
| Total | 100 | 100 | 100 | 100 |
| (B)/(A) + (B) (wt %) | 5 | 11.5 | 21.3 | 0 |
| Young's modulus (MPa) | 763 | 673 | 571 | 884 |
| Steady state compliance ($J_e$) (MPa$^{-1}$) | 2.4 | 3.6 | 6.6 | 1.4 |

M113: Nonylphenol ethylene oxide-modified acrylate (manufactured by Toagosei Co., Ltd.)
Viscoat #700: Diacrylate of ethylene oxide addition of bisphenol A (manufactured by Osaka Organic Chemical Industry Ltd.)
Irgacure 184: 1-Hydroxycyclohexyl phenyl ketone (manufactured by Ciba Specialty Chemicals Co., Ltd.)
TPO-X: 2,2,4,6-trimethylbenzoyl diphenylphosphine oxide (manufactured by Ciba Specialty Chemicals Co., Ltd.)
Sumilizer GA-80: 3,9-bis[2-{3-(3-t-butyl-4-hydroxy-5-methylphenyl)propionyloxy}-1,1-dimethylethyl]-2,4,8,10-tetraoxaspiro[5,5]undecane (manufactured by Sumitomo Chemical Co., Ltd.)

As can be seen from Table 1, the resin compositions of the Examples exhibit no turbidity in a liquid state, a Young's modulus of elasticity sufficient for a secondary coating composition, and a low attaching force. Further, Table 2 and Table 3 show that the resin compositions feature a low coefficient of friction and a high steady state compliance.

The invention claimed is:

1. A curable liquid resin composition comprising:
   (A) a urethane(meth)acrylate having a structure originating from a polyol and a number average molecular weight of 800 g/mol or more, but less than 6,000 g/mol, and
   (B) a urethane(meth)acrylate having a structure originating from a polyol and a number average molecular weight of 8,000 g/mol or more, but less than 18,000 g/mol,
   wherein (A) differs from (B) in the molecular weight of the polyol used as the raw material, and wherein the total amount of the component (A) and component (B) is 20-95 wt % of the curable liquid resin composition and the content of the component (B) is 0.1-30 wt % of the total of the component (A) and component (B).

2. A curable liquid resin composition comprising: according to claim 1, wherein the total amount of the component (A) and component (B) is 30-95 wt % of the curable liquid resin composition.

3. The curable liquid resin composition according to claim 1, wherein the structure originating from the polyol in the component (A) or component (B) is at least one structure originating from a polyester polyol or a polyether polyol which is selected from the group consisting of polypropylene glycol, a copolymer of 1,2-butylene oxide and ethylene oxide, and a copolymer of propylene oxide and ethylene oxide.

4. The curable liquid resin composition according to claim 1, wherein both the component (A) and the component (B) have a structure originating from polypropylene glycol.

5. The curable liquid resin composition according to claim 1, further comprising a polymerizable polyfunctional monomer.

6. The curable liquid resin composition according to claim 1, wherein cured products made from the composition attached to each other can be detached with a detaching force of 5 N/m or less.

7. The curable liquid resin composition according claim 1, wherein cured products made from the composition have a coefficient of friction of 0.8 or less.

8. The curable liquid resin composition according to claim 1 having a steady state compliance ($J_e$) of 2 MPa$^{-1}$ or more.

9. The curable liquid resin composition according to claim 1, the cured material obtained after curing said curable liquid resin composition having a Young's modulus of 30 MPa or more.

10. The curable liquid resin composition according to claim 1, wherein the resin is colored.

11. A curable liquid resin composition system, said system comprising a primary resin composition and a secondary resin composition for use as an optical fiber dual coating system, wherein the secondary coating composition is the curable liquid resin composition according to claim 1.

12. The curable liquid resin composition according to claim 1 which is a secondary resin composition, an ink material, a buffer material or a matrix material on an optical glass fiber.

13. A coated optical fiber comprising a glass optical fiber and at least one coating on said glass optical fiber which is derived from the curable liquid resin composition of claim 1.

14. An optical fiber ribbon comprising a plurality of coated optical fibers according to claim 13 held together by a matrix material.

15. An optical fiber ribbon comprising a plurality of coated and optionally inked optical fibers held together by a matrix material, wherein the matrix material is derived from the curable liquid resin composition of claim 1.

16. The optical fiber ribbon of claim 14, wherein said plurality of coated optical fibers are inked.

17. The optical fiber ribbon of claim 15, wherein said plurality of coated optical fibers are inked.

* * * * *